United States Patent

Randhava

[15] 3,663,162
[45] May 16, 1972

[54] METHOD FOR SELECTIVE METHANATION OF GASEOUS MIXTURE CONTAINING CARBON MONOXIDE

[72] Inventor: Sarabjit Singh Randhava, Chicago, Ill.
[73] Assignee: Institute of Gas Technology
[22] Filed: June 24, 1969
[21] Appl. No.: 836,047

[52] U.S. Cl. ............................23/2 S, 23/210, 252/477 Q
[51] Int. Cl. ........................................B01d 53/34, C01b 1/30
[58] Field of Search..........................23/2.1, 3.1, 4, 210, 204; 252/477 Q

[56] References Cited

UNITED STATES PATENTS

| | | | |
|---|---|---|---|
| 3,448,060 | 6/1969 | Mason | 252/466 |
| 3,475,524 | 10/1969 | Mason | 264/82 |

FOREIGN PATENTS OR APPLICATIONS 719,637   10/1965   Canada.................................23/1 S

OTHER PUBLICATIONS

Dirksen et al., " Pipeline Gas By Methanation of Synthesis Gas over Rahey Nickel Catalyst," Industrial and Engineering Chemistry, Volume 52, No. 7, July 1960, pp. 584– 589.

Primary Examiner—Earl C. Thomas
Attorney—Molinare, Allegretti, Newitt & Witcoff

[57] ABSTRACT

A method for the selective methanation of a gaseous mixture containing hydrogen, carbon dioxide, and carbon monoxide with the carbon monoxide being present in an amount up to about 1 percent, which contemplates the contacting of said gaseous mixture with a Raney-type nickel catalyst containing from about 30–35 percent nickel, 5–18 percent aluminum, and balance $Al_2O_3 \cdot 3H_2O$; at elevated temperatures.

6 Claims, 1 Drawing Figure

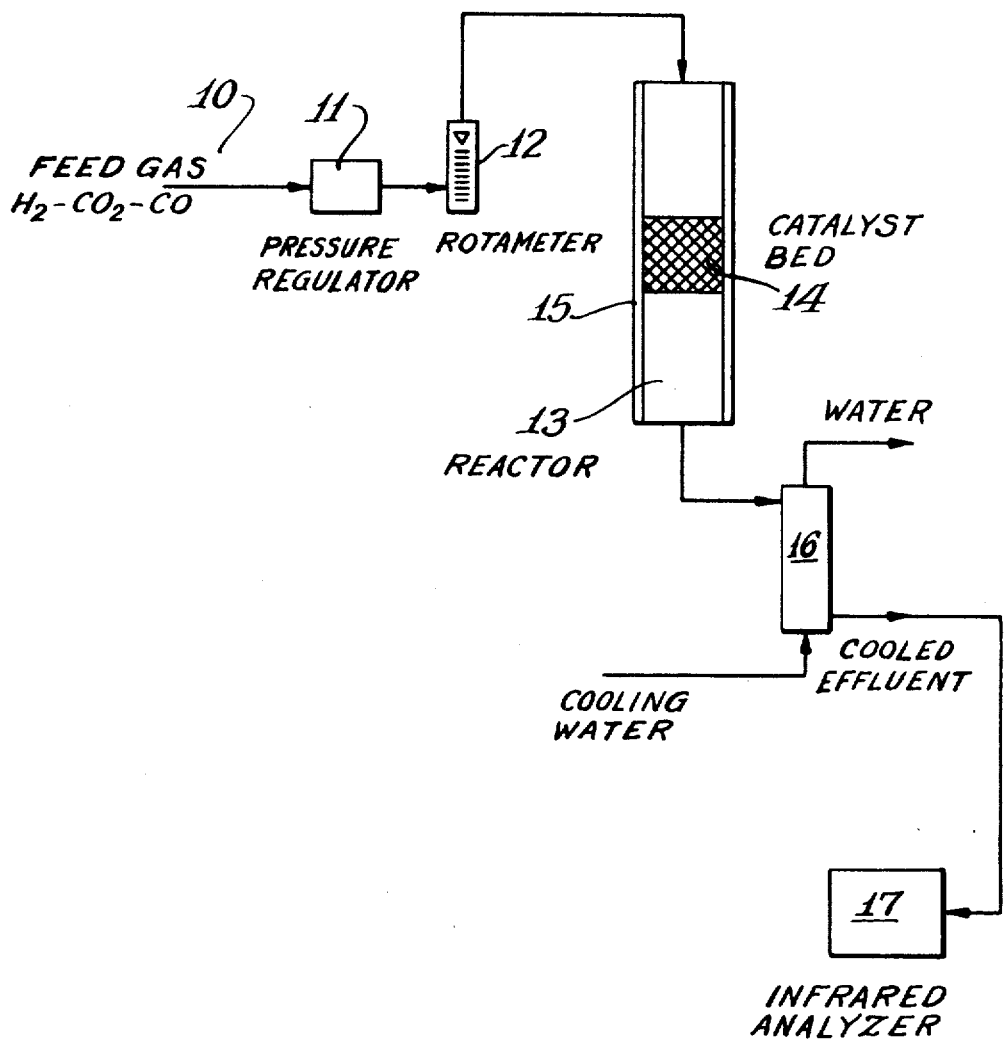

1

METHOD FOR SELECTIVE METHANATION OF GASEOUS MIXTURE CONTAINING CARBON MONOXIDE

CROSS REFERENCES TO RELATED APPLICATIONS

This application disclosed a method for the selective methanation of carbon monoxide by the use of a Raney-type nickel catalyst which is disclosed in the applications of David M. Mason: Ser. No. 547,041, filed May 2, 1966, for "SUPPORTED SKELETAL NICKEL CATALYST", now U.S. Pat. No. 3,448,060; and Ser. No. 547,043, filed May 2, 1966, for "ALUMINA BONDING", now U.S. Pat. No. 3,475,524. The disclosures of said patents are hereby incorporated by reference into the present application insofar as they are pertinent hereto.

BACKGROUND OF THE INVENTION

This invention relates to a method for the selective removal of carbon monoxide from a gaseous mixture containing hydrogen, carbon monoxide and carbon dioxide. More particularly, the invention provides a method for decreasing the concentration of carbon monoxide, in a gaseous mixture which is substantially entirely made up of hydrogen and carbon dioxide with carbon monoxide being present in an amount up to about 1 percent, to about 50 to 100 parts per million (ppm).

Presently, one of the most common methods for the manufacture of hydrogen suitable for commercial use is by steam reforming of hydrocarbons followed by a water gas shift reaction. However, gaseous hydrogen made by such a method commonly contains impurities such as carbon dioxide, methane and carbon monoxide. Some of these impurities render the hydrogen unsuitable for a number of specific purposes. In particular, when the hydrogen is to be used in a fuel cell, the presence of carbon monoxide has been found to adversely affect the operation of the fuel cell. It appears that the carbon monoxide poisons the noble metal electrodes in the fuel cell. Therefore, the carbon monoxide content must be reduced to as low a level as possible.

The gaseous hydrogen obtained by steam reforming of hydrocarbon followed by a shift reaction typically may contain about 80 percent or slightly less hydrogen, about 20 percent carbon dioxide and up to about 1 percent carbon monoxide (e.g. 0.3 percent). All percentages are by volume. Two techniques for the removal of the carbon monoxide are known: methanation and selective oxidation of the CO. However, the selective oxidation of CO in the presence of large quantities of $CO_2$ is considered to be highly unfeasible. Therefore, it is preferable to employ a methanation reaction between the carbon monoxide and hydrogen in accordance with the following equation:

$$CO + 3H_2 \rightleftharpoons CH_4 + H_2O \tag{1}$$

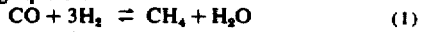

However, in a gaseous mixture containing substantial amounts of hydrogen and carbon dioxide, other undesirable reactions may also take place. These reactions include:

$$CO_2 + 4H_2 \rightleftharpoons CH_4 + 2H_2O \tag{2}$$

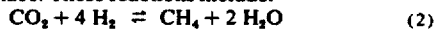

$$CO_2 + H_2 \rightleftharpoons CO + H_2O \tag{3}$$

Reaction 2 is undesirable since it produces methane and consumes hydrogen. Reaction 3 is clearly undesirable since it consumes hydrogen and results in the production of more carbon monoxide. Therefore, it is desirable to limit the reactions to the methanation of carbon monoxide as represented by Reaction 1. This is the selective methanation of carbon monoxide in the presence of substantial amounts of carbon dioxide. The methanation reaction is further complicated by the fact that it is a highly exothermic reaction and once the carbon dioxide starts to methanate in appreciable quantities, it becomes very difficult to control the temperature of the reacting system.

It has been proposed to selectively methanate the carbon monoxide in the presence of substantial amounts of carbon dioxide and hydrogen, by the use of a ruthenium catalyst. See, Baker et al. application Ser. No. 701,036, filed Jan. 10, 1968, for Process For Selective Removal of CO From a Mixture of Gases. Such selective methanation of a mixture containing substantially only hydrogen and carbon dioxide, with a fraction of 1 percent carbon monoxide, in the presence of ruthenium catalyst, is effective to reduce the carbon monoxide concentration down to about 50 ppm. However, ruthenium catalyst is extremely expensive and the use of such a catalyst on a commercial scale would be prohibitively expensive. Therefore, there is a need for a novel process for the selective methanation of a gaseous mixture containing primarily hydrogen and carbon dioxide, with carbon monoxide present in amounts up to about 1 percent.

It is, accordingly, an object of the present invention to provide a novel process for the selective methanation of a gaseous stream containing primarily hydrogen and carbon dioxide, with carbon monoxide being present in amounts up to about 1 percent or slightly higher.

It is another object of the present invention to provide a process for the selective removal of carbon monoxide, from a gaseous mixture containing mostly hydrogen and carbon dioxide, to reduce the carbon monoxide concentration in said mixture to about 100 ppm or lower.

These and other objects of the invention can be gathered from a reading of the following disclosure.

SUMMARY OF THE INVENTION

In accordance with the present invention, there is provided a novel process for the selective removal of relatively small amounts of carbon monoxide from a gaseous mixture containing mostly hydrogen and carbon dioxide, by the selective methanation of carbon monoxide in the presence of a Raney-type nickel catalyst at a temperature between about 175°–250°C.

DESCRIPTION OF THE PREFERRED EMBODIMENT

As indicated above, the present invention provides a novel method for the removal of relatively small amounts of carbon monoxide from a gaseous mixture containing mostly hydrogen and carbon dioxide by the selective methanation of carbon monoxide in the presence of a Raney-type nickel catalyst. The process is sensitive to temperature and by relatively close control of the temperature, a gaseous product containing about 100 ppm of CO or less may be obtained.

The Raney-type nickel catalysts suitable for use in the process of the present invention are those made in accordance with a special procedure as disclosed in the applications of David M. Mason, Ser. No. 547,041, filed May 2, 1966, for "SUPPORTED SKELETAL NICKEL CATALYST" and Ser. No. 547,043, filed May 2, 1966, for "ALUMINA BONDING", now U.S. Pat. Nos. 3,448,060 and 3,475,524, respectively. As will be shown below, the commonly available commercial types of nickel catalyst are not suitable for the purposes of the present invention.

The gaseous mixture to be treated by the present invention comprises a mixture of hydrogen and carbon dioxide with a small amount of carbon monoxide therein. For example, a gaseous hydrogen mixture obtained by steam reforming of hydrocarbon followed by a shift reaction typically may contain about 80 percent hydrogen and 20 percent carbon dioxide. This amount may vary by several percentage points, depending on the reaction conditions employed to produce the hydrogen gas. Normally, a small amount of carbon monoxide is present in such a mixture, up to about 1 percent or slightly higher. For example, such a hydrogen stream may contain about 20 percent carbon dioxide, 0.3 percent carbon monoxide, the balance being hydrogen. In order to render this hydrogen suitable for special usage, such as for use in a fuel cell, the carbon monoxide in the mixture must be substantially completely removed. Generally, an amount of the carbon monoxide in the hydrogen stream of about 100 ppm or slightly higher can be tolerated by low-platinum-loading fuel cells.

As indicated above, the principal problem involved in removing small amounts of carbon monoxide from a stream containing relatively large amounts of carbon dioxide by methanation is that both the CO and $CO_2$ methanate rapidly which consumes a large amount of hydrogen and which cause the temperature of the system to be very difficult to control since the methanation reaction is highly exothermic. Surprisingly, we have found that a Raney-type nickel catalyst made in accordance with a particular procedure is highly suitable for the selective methanation of CO in a mixture of $CO_2$ and hydrogen to reduce the CO content down to about 100 ppm or less.

The Raney-type nickel catalyst useful in the present invention is made in accordance with the procedure disclosed in the two patents of Mason, identified above. Briefly, one of the methods involves the making of a coated catalyst structure which comprises coating an inert support form, such as a Berl saddle, with an aqueous slurry of pulverized aluminum-nickel alloy and aluminum hydroxide, drying the coating, heating the coated forms at 50° C or above, immersing the coated form in water at about 25°–100° C, and then leaching the coated forms with alkali hydroxide solution to dissolve at least part of the aluminum to obtain an active skeletal nickel catalyst. This method results in a supported catalyst, i.e., a nickel catalyst supported on Berl saddles. The other of said methods disclosed by Mason involves maintaining particles of aluminum-nickel alloy immobilized, treating the immobilized particles with water to obtain a consolidated structure, and leaching the consolidated structure with alkali hydroxide to remove aluminum therefrom. This method results in an unsupported catalyst structure.

In the Raney-type nickel catalyst produced by the method of Mason, the amount of finely divided nickel which is present in the catalyst after leaching by alkali hydroxide depends on the amount of aluminum leached out of the aluminum nickel alloy. I have found that about 30–35 percent nickel concentration in the catalyst, exclusive of any support material, is extremely effective for the purposes of the present invention, although slightly higher or lower nickel concentrations may be used. Preferably, the nickel content in the catalyst is about 35 percent.

As indicated above, the catalyst which can be used in the present invention may be of the supported or unsupported variety. However, due to the significantly larger surface area per unit volume for unsupported catalyst, as compared to the supported catalyst, it is important to use the unsupported catalyst to obtain the maximum amount of gas treated per volume of the reactor.

The CO content in gaseous mixture treated by the process of the present invention depends on the space velocity of the gas being treated, the composition of the catalyst, and the temperature for the treating reaction.

With respect to the catalyst composition, the Mason-type Raney nickel catalyst is a consolidated structure containing nickel, aluminum and $Al_2 O_3 \cdot 3 H_2O$. The important characteristics of the catalyst, for the purposes of the present invention, are primarily determined by the nickel content thereof. For the purposes of the present invention, about 30–35 percent nickel in the catalyst is suitable, with 35 percent being preferred, although somewhat more or less nickel can be used. Two specific examples of such catalysts have the following compositions: 35 percent nickel, 5 percent aluminum 60% $Al_2 O_3 \cdot 3 H_2O$; and 30 percent nickel, 18 percent aluminum and 52 % $Al_2 O_3 \cdot 3 H_2O$.

The optimum temperature for the reaction depends on the catalyst employed. For example, with the 35 percent catalyst described above, the optimum operating temperature appears to be about 200° C whereas for the 30 percent nickel catalyst, the optimum temperature appears to be about 225° C.

The space velocity of the gas which can be treated in accordance with the process of the present invention depends on the catalyst employed and the requirements placed on the treated gaseous product. Thus, for example, with the 35 percent nickel catalyst described above, at an operating temperature about 200° C, the final concentration of CO is about 70 ppm at a space velocity of 9,000 standard cubic feet (SCF) per cubic foot of catalyst per hour; and the CO concentration is 100 ppm at 13,500 SCF per cubic foot of catalyst per hour. Thus, if 100 ppm CO in the product gas can be tolerated, a space velocity of 13,500 SCF per cubic foot of catalyst per hour can be achieved, although lower space velocities would produce a product containing less CO. Generally, lower space velocities will result in lower CO concentration in the product gas. However, it appears generally that when 100 ppm CO can be tolerated in the final product gas, a space velocity of 9,000 SCF per cubic foot of catalyst per hour can be used with the catalysts described herein to produce a satisfactory product gas.

The invention will now be further described by the following examples.

EXAMPLE

Six catalysts, labelled and identified by alphabetical order shown in Table I below were employed to selectively methanate a gaseous stream containing primarily hydrogen and $CO_2$.

TABLE I

| Legend | Catalyst | Composition |
| --- | --- | --- |
| A | Ruthenium | 0.5% Ru on α-Alumina |
| B | Mason Raney nickel (twice leached) | 35% Ni<br>5% Al<br>60% $Al_2 O_3 \cdot 3 H_2O$ |
| C | Mason Raney nickel | 30% Ni<br>18% Al<br>52% $Al_2 O_3 \cdot 3 H_2O$ |
| D | Harshaw nickel | 58% Ni on Kieselguhr |
| E | C.C.I. nickel | 47% nickel oxide on Alumina |
| F | Girdler G-65 | 32% Ni on α-Alumina |

The experimental apparatus used for the selective methanation is as shown in the FIGURE.

In the FIGURE, a feed gas stream containing about 20% $CO_2$, 3050 ppm CO, the balance being hydrogen, is generally indicated at 10. This feed gas is first passed through a pressure regulator 11 and a rotameter 12, and then into the top of a reactor 13. Reactor 13 is made from a SS 304 tubing having 0.5 inch inside diameter and 1 inch outside diameter and 22 inches long and contains a catalyst bed 14 and a heated jacket 15. The reactor is heated electrically although this is not critical. A multi-point thermocouple (not shown) is located in the reactor to measure the temperatures at various points. After passing through the reactor, the gaseous mixture is then passed through a water-cooled condenser 16 and the cooled effluent gas was then analyzed by an infrared analyzer (MSA Model 300, made by Mine Safety Appliance Company). The analyzer is believed to be capable of determining the carbon monoxide content within a accuracy of about 2 ppm.

The Mason Raney nickel catalyst B and C were of the unsupported variety. The Harshaw catalyst D possessed the trade designation Ni–0116T. The Catalysts and Chemicals, Inc. catalyst E is known as its C–13–4 catalyst.

The results of runs at five space velocities varying between 9,000 and 36,000 SCF per cubic foot of catalyst per hour, for each of the six catalysts listed in Table I above are tabulated below in Table II.

TABLE II

[CO concentration in feed = 3,050 p.p.m.]

| Temp., C. | Space velocity SCF cu. ft. catalyst-hr. | CO concentration in effluent in p.p.m. for catalyst | | | | | |
| --- | --- | --- | --- | --- | --- | --- | --- |
| | | A | B | C | D | E | F |
| 125 | 9,000 | 2,860 | 2,860 | 2,860 | 2,860 | 2,960 | 2,960 |
| | 13,500 | 2,900 | 2,920 | 2,900 | 2,900 | 2,970 | 3,000 |
| | 18,000 | 2,928 | 2,950 | 2,930 | 2,925 | 2,980 | 3,020 |
| | 27,000 | 2,970 | 2,970 | 2,960 | 2,965 | 2,990 | 3,030 |
| | 36,000 | 3,000 | 3,020 | 2,985 | 3,000 | 3,000 | 3,040 |

TABLE II

[CO concentration in feed = 3,050 p.p.m.]

| Temp., C. | Space velocity SCF cu. ft. catalyst-hr. | CO concentration in effluent in p.p.m. for catalyst | | | | | |
|---|---|---|---|---|---|---|---|
| | | A | B | C | D | E | F |
| 150 | 9,000 | 2,750 | 2,600 | 2,800 | 2,650 | 2,900 | 2,940 |
| | 13,500 | 2,825 | 2,700 | 2,840 | 2,750 | 2,920 | 2,970 |
| | 18,000 | 2,890 | 2,800 | 2,880 | 2,830 | 2,940 | 2,980 |
| | 27,000 | 2,940 | 2,885 | 2,920 | 2,900 | 2,980 | 3,010 |
| | 36,000 | 2,970 | 2,960 | 2,960 | 2,950 | 3,000 | 3,040 |
| 175 | 9,000 | 2,510 | 1,400 | 2,660 | 2,245 | 2,760 | 2,925 |
| | 13,500 | 2,640 | 1,950 | 2,740 | 2,480 | 2,825 | 2,940 |
| | 18,000 | 2,760 | 2,300 | 2,790 | 2,660 | 2,870 | 2,960 |
| | 27,000 | 2,810 | 2,480 | 2,840 | 2,770 | 2,920 | 3,010 |
| | 36,000 | 2,900 | 2,790 | 2,900 | 2,865 | 2,960 | 3,030 |
| 200 | 9,000 | 1,200 | 70 | 2,200 | 1,560 | 2,590 | 2,900 |
| | 13,500 | 1,760 | 100 | 2,430 | 1,900 | 2,660 | 2,920 |
| | 18,000 | 2,080 | 160 | 2,550 | 2,240 | 2,740 | 2,940 |
| | 27,000 | 2,310 | 375 | 2,640 | 2,530 | 2,820 | 2,980 |
| | 36,000 | 2,560 | 930 | 2,720 | 2,680 | 2,900 | 3,000 |
| 225 | 9,000 | 345 | 200 | 100 | 930 | 2,700 | 2,880 |
| | 13,500 | 600 | 270 | 700 | 1,230 | 2,740 | 2,900 |
| | 18,000 | 1,000 | 350 | 1,620 | 1,600 | 2,805 | 2,960 |
| | 27,000 | 1,440 | 460 | 2,000 | 2,040 | 2,860 | 2,980 |
| | 36,000 | 1,800 | 575 | 2,200 | 2,360 | 2,910 | 3,000 |
| 250 | 9,000 | 50 | 580 | 510 | 1,110 | 2,900 | 2,750 |
| | 13,500 | 85 | 650 | 720 | 1,280 | 2,950 | 2,800 |
| | 18,000 | 200 | 700 | 910 | 1,530 | 2,980 | 2,850 |
| | 27,000 | 420 | 740 | 1,030 | 1,700 | 3,000 | 2,900 |
| | 36,000 | 860 | 780 | 1,130 | 1,980 | 3,040 | 2,990 |
| 275 | 9,000 | 280 | 1,250 | 1,280 | 1,560 | 3,300 | 2,920 |
| | 13,500 | 360 | 1,190 | 1,240 | 1,700 | 3,280 | 2,940 |
| | 18,000 | 500 | 1,130 | 1,200 | 1,980 | 3,260 | 2,960 |
| | 27,000 | 650 | 1,060 | 1,160 | 2,130 | 3,250 | 2,980 |
| | 36,000 | 860 | 1,000 | 1,100 | 2,300 | 3,240 | 3,020 |
| 300 | 9,000 | 750 | 3,260 | 2,780 | 3,200 | 3,880 | 3,320 |
| | 13,500 | 870 | 1,900 | 2,540 | 3,160 | 3,770 | 3,280 |
| | 18,000 | 950 | 1,700 | 2,300 | 3,100 | 3,640 | 3,260 |
| | 27,000 | 1,100 | 1,500 | 2,120 | 3,000 | 3,550 | 3,240 |
| | 36,000 | 1,270 | 1,300 | 1,880 | 2,860 | 3,500 | 3,200 |

Although space velocities of between 9,000 and 36,000 SCF per cubic foot catalyst per hour were employed for the above runs, it will be appreciated that lower space velocities will result in lower CO concentration in the product gas. However, since 100 ppm of CO in the product gas may be tolerated for most purposes, it is more economical to carry out the selective methanation reaction at as high a space velocity as possible. Therefore, the present example is restricted to the relatively high space velocities of 9,000 to 36,000 SCF per cubic foot of catalyst per hour.

Referring to Table II above, it can be seen that catalyst A, containing about 0.5 percent ruthenium, will produce a product gas having CO concentration less than 100 ppm at about 250° C for space velocities of about 13,500. On the other hand, catalysts B and C, the catalysts used in the method of the present invention and containing about 35 percent and 30 percent nickel, respectively, will also produce a product gas having a CO concentration of about 100 ppm or less at slightly lower space velocities and lower temperatures. In contrast to the first three catalysts, catalysts D, E and F, all commercially available nickel catalysts, are all incapable of producing a product gas containing as low a CO concentration as 500 ppm.

The invention has been described in detail with reference to particular and preferred embodiments thereof, but it will be understood that variations and modifications can be made within the spirit and scope of the invention as described hereinabove and as defined in the appended claims.

What is claimed is:

1. A method for reducing the CO content of a gaseous mixture containing $H_2$, $CO_2$ and about 1 % CO which comprises:
    1. heating said gaseous mixture to a temperature between about 175° and 250° C, and
    2. passing said gaseous mixture into contact with a supported or unsupported Raney nickel catalyst containing from about 30–35 percent nickel, 5–18 percent aluminum, and the balance $Al_2 O_3 \cdot 3H_2O$ to selectively methanate said CO in the presence of said $CO_2$ by reaction with said $H_2$, without conversion of substantial amounts of $CO_2$ to methane or CO, thereby to reduce the CO content of said gas to below about 100 ppm.

2. A method according to claim 1 wherein said nickel catalyst is an unsupported catalyst, being a consolidated structure prepared by the steps of:
    1. immobilizing particles of an aluminum-nickel alloy,
    2. treating said immobilized particles with water to generate hydrogen gas,
    3. removing generated hydrogen gas to produce a consolidated structure of particles bonded together by hydrated aluminum oxide, and
    4. leaching said consolidated structure with alkali hydroxide to produce said catalyst.

3. A method according to claim 2 wherein said temperature is about 200°–225° C.

4. A method according to claim 2 wherein said aluminum-nickel alloy contains about 30–35 percent by weight nickel and about 70–65 percent by weight aluminum.

5. A method according to claim 2 wherein said alloy particles are coated on a support and maintained immobilized thereon.

6. A method according to claim 2 wherein the space velocity of said gaseous mixture is between about 9,000 to 36,000 SCF per cubic foot of catalyst per hour.

* * * * *